United States Patent
Janak et al.

(10) Patent No.: US 9,347,383 B2
(45) Date of Patent: May 24, 2016

(54) INTRA-CYLINDER AUXILIARY ACTUATION OF ENGINE VALVES THROUGH SELECTIVE DISCONTINUATION OF MAIN VALVE EVENTS

(71) Applicant: Jacobs Vehicle Systems, Inc., Bloomfield, CT (US)

(72) Inventors: Robb Janak, Bristol, CT (US); G. Michael Gron, Jr., Granby, CT (US)

(73) Assignee: JACOBS VEHICLE SYSTEMS, INC., Bloomfield, CT (US)

( * ) Notice: Subject to any disclaimer, the term of this patent is extended or adjusted under 35 U.S.C. 154(b) by 190 days.

(21) Appl. No.: 14/190,540

(22) Filed: Feb. 26, 2014

(65) Prior Publication Data

US 2014/0238324 A1    Aug. 28, 2014

Related U.S. Application Data

(60) Provisional application No. 61/769,704, filed on Feb. 26, 2013.

(51) Int. Cl.

| *F01L 1/34* | (2006.01) |
|---|---|
| *F02D 13/02* | (2006.01) |
| *F01L 1/08* | (2006.01) |
| *F01L 9/02* | (2006.01) |
| *F01L 13/06* | (2006.01) |

(52) U.S. Cl.
CPC ............... *F02D 13/0203* (2013.01); *F01L 1/08* (2013.01); *F01L 9/021* (2013.01); *F01L 9/025* (2013.01); *F01L 13/06* (2013.01); *F01L 13/065* (2013.01); *F01L 2800/10* (2013.01); *Y02T 10/18* (2013.01)

(58) Field of Classification Search
CPC ........ F02D 13/02; F02D 13/0203; F01L 1/08; F01L 9/021; F01L 13/06; F01L 13/065; F01L 9/025; F01L 2800/10
USPC ............................................ 123/90.16, 90.39
See application file for complete search history.

(56) References Cited

U.S. PATENT DOCUMENTS

| 5,746,175 | A | 5/1998 | Hu |
| 6,244,257 | B1 | 6/2001 | Hu |
| 6,267,098 | B1 | 7/2001 | Vanderpoel |
| 7,823,553 | B2 * | 11/2010 | Meistrick ............... F01L 13/065 123/90.15 |
| 2011/0132298 | A1 | 6/2011 | Ruggiero | |

OTHER PUBLICATIONS

International Preliminary Report on Patenntability; filed in PCT/US2014/018633; issued Sep. 1, 2015; 8 pgs.
Search Report and Written Opinion issued in PCT/US2014/018633 on Jun. 18, 2014.

\* cited by examiner

*Primary Examiner* — Zelalem Eshete
(74) *Attorney, Agent, or Firm* — Vedder Price, P.C.

(57) ABSTRACT

A third motion transfer mechanism transfers valve actuation motion from a second motion source to a first engine valve. A motion decoupler is configured to selectively discontinue the transfer of motion from a first motion transfer mechanism to the first engine valve. Furthermore, a reset mechanism is configured to selectively discontinue, based on operation of a second motion transfer mechanism, the transfer of motion from the third motion transfer mechanism to the first engine valve. The third motion transfer mechanism may comprise a master piston and a slave piston in fluid communication with each other via a hydraulic circuit, the master piston being configured to receive motion from the second motion source and the slave piston being configured to transfer motion to the first engine valve.

31 Claims, 5 Drawing Sheets

INTRA-CYLINDER AUXILIARY ACTUATION OF ENGINE VALVES THROUGH SELECTIVE DISCONTINUATION OF MAIN VALVE EVENTS

CROSS-REFERENCE TO RELATED APPLICATION

The instant application claims the benefit of Provisional U.S. Patent Application Ser. No. 61/769,704, filed Feb. 26, 2013, the teachings of which are incorporated herein by this reference.

FIELD

The instant disclosure relates generally to internal combustion engines and, in particular, to an apparatus and system for actuating engine valves.

BACKGROUND

Internal combustion engines typically use either a mechanical, electrical, or hydro-mechanical valve actuation system to actuate the intake and exhaust engine valves. These systems may include a combination of camshafts, rocker arms and pushrods that are driven by the engine's crankshaft rotation. When a camshaft is used to actuate the engine valves, the timing of the valve actuation may be fixed by the size and location of fixed lobes on the camshaft(s).

Additional auxiliary valve events, while not required, may be desirable and are known to provide flow control of exhaust gas through an internal combustion engine in order to provide vehicle engine braking. For example, it may be desirable to actuate the exhaust valves for compression-release (CR) engine braking, bleeder engine braking, exhaust gas recirculation (EGR), brake gas recirculation (BGR), or other auxiliary valve events. However, the use of fixed cam profiles makes it difficult to adjust the timings and/or amounts of engine valve lift to optimize valve operation for various engine operating conditions.

One method of adjusting valve timing and lift given a fixed cam profile has been to incorporate a lost motion device in the valve train linkage between the valve and the cam. Lost motion is the term applied to a class of technical solutions for modifying the valve motion dictated by a fixed cam profile with a variable length mechanical, hydraulic or other linkage assembly. In a lost motion system a cam lobe may provide the maximum dwell (time) and greatest lift motion needed over a full range of engine operating conditions. A variable length system may then be included in the valve train linkage intermediate of the valve to be opened and the cam providing the maximum motion to subtract or "lose" part or all of the motion imparted by the cam to the valve. This variable length system, or lost motion system may, when expanded fully, transmit all of the cam motion to the valve and when contracted fully transmit none or a minimum amount of the cam motion to the valve.

Unfortunately, such known conventional systems may not provide the desired level of engine braking power. This is particularly true in those instances where certain engines cannot be configured with the extra parts necessary to provide the desired amount of braking power. For example, maximum engine braking power may be obtained when cams, dedicated to the valve timings and lifts needed to maximize engine braking, are provided. However, some engines do not have sufficient room or configurations to permit the inclusion of such dedicated cams. In these cases, the sole sources of engine valve movement are the fixed intake and exhaust cams. Additionally, the lobes dictated by these fixed intake and exhaust cam profiles prevent the inclusion of additional cam lobes that may otherwise be used to achieve the desired auxiliary motions.

To address these limitations, it is known in the art to leverage the different intake and exhaust valve timings between multiple cylinders to achieve the desired auxiliary valve events. In these systems, lost motion linkages are provided between the valves of one cylinder and the intake or exhaust valve motion sources of other cylinders. In a best case scenario, the auxiliary motions for a given cylinder are derived from one or more adjacent cylinders; however, it is often the case that the auxiliary motions must be derived from other, most distal cylinders. Regardless, in either case, the existence of multiple, inter-cylinder, lost motion linkages results in a relatively complex and, consequently, more expensive engine braking system.

Thus, it would be advantageous to provide solutions for engine braking and other auxiliary valve movement regimes that overcome the limitations of conventional systems.

SUMMARY

The instant disclosure describes an apparatus for actuating a first engine valve of a given cylinder based not only on a first motion source that is uniquely associated with the cylinder and used to provide conventional actuation of the first engine valve, but also based on a second motion source, also uniquely associated with the same cylinder. In particular, an internal combustion engine may have a first motion source providing motion to the first engine valve (such as, for example, an exhaust valve) via a first motion transfer mechanism. Likewise, a second motion source may provide motion to at least one second motion sink (such as, for example, one or more intake valves or fuel injectors) via a second motion transfer mechanism. A third motion transfer mechanism is provided that is configured to be operatively connected to the second motion source and the first engine valve, thereby transferring motion from the second motion source to the first engine valve. A motion decoupler is configured to be operatively connected to the first motion transfer mechanism and the first engine valve, and further configured to selectively discontinue the transfer of motion from the first motion transfer mechanism to the first engine valve. Furthermore, a reset mechanism is configured to be operatively connected to the second motion transfer mechanism and the third motion transfer mechanism, and further configured to selectively discontinue, based on operation of the second motion transfer mechanism, the transfer of motion from the third motion transfer mechanism to the first engine valve. A controller may be used to instruct the motion decoupler when to discontinue transfer of motion from the first motion transfer mechanism to the first engine valve.

In an embodiment, the third motion transfer mechanism may comprise a master piston and a slave piston in fluid communication with each other via a hydraulic circuit, the master piston being configured to receive motion from the second motion source and the slave piston being configured to transfer motion to the first engine valve. The third motion transfer mechanism may be disposed within a housing configured to be attached to the internal combustion engine, or may be disposed within a rocker arm. Further still, the rocker arm may comprise an intake rocker arm or an exhaust rocker arm. A check valve may be provided to supply hydraulic fluid to the hydraulic circuit, which check valve may be further disposed within a control valve. In various embodiments, the reset mechanism may comprise a valve configured to release hydraulic fluid from the hydraulic circuit, or an accumulator configured to receive fluid from the hydraulic circuit. Additionally, where the second motion source comprises a cam, or a cam and pushrod, the cam may comprise a lost motion profile.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
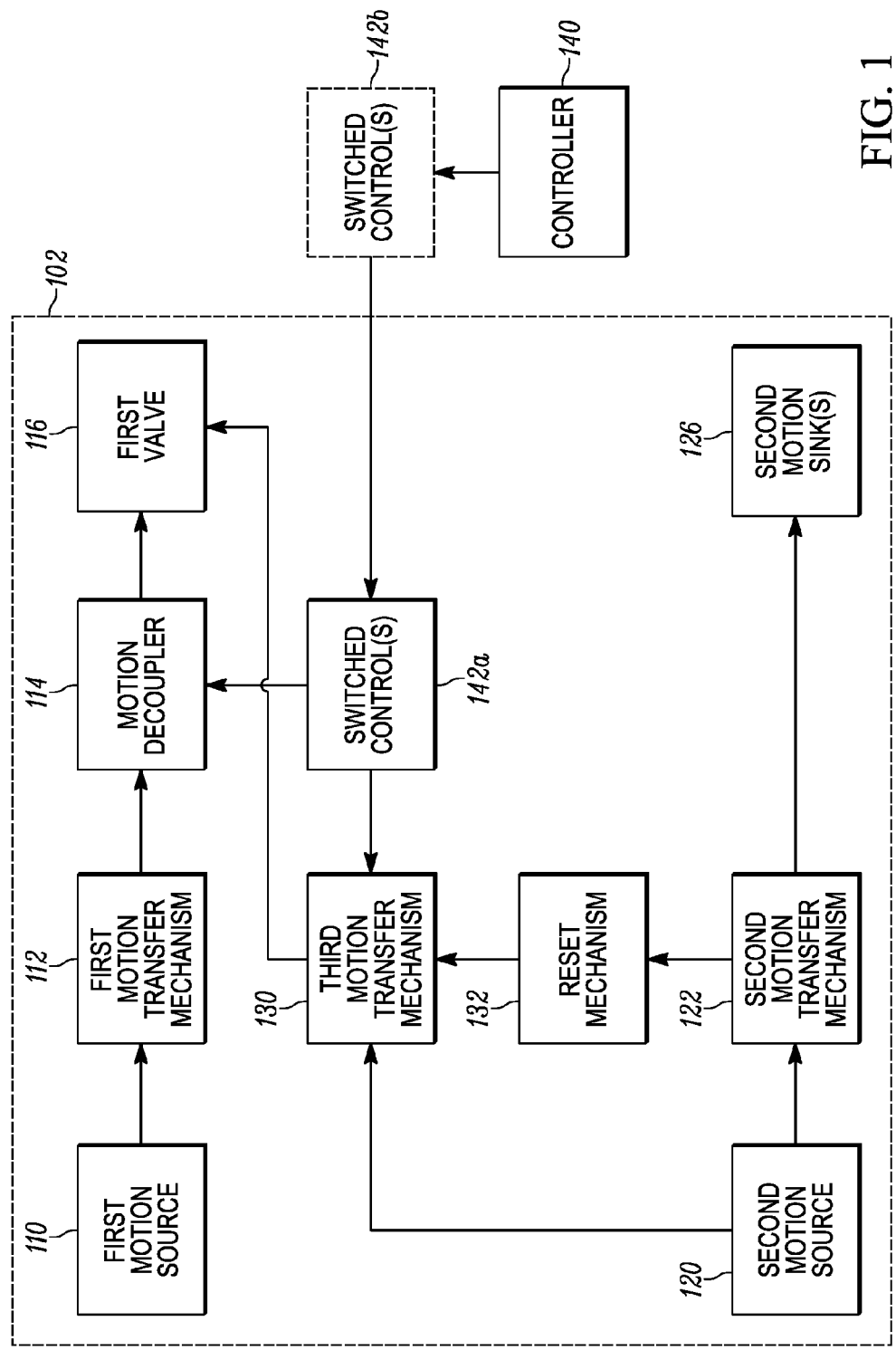
FIG. 1 is a schematic block diagram illustrating a system relating to an internal combustion engine and, more specifically, an apparatus in accordance with a first embodiment of the instant disclosure.

Referring now to FIG. 1, components of an internal combustion engine are illustrated in conjunction with a first embodiment of an apparatus for effectuating auxiliary valve motions. In particular, a first motion source 110 and a second motion source 120 are uniquely associated with a given cylinder, schematically illustrated by block 102. The motion sources 110, 120 may take a number of different forms, as known in the art. For example, in the case of an internal combustion engine employing one or more overhead cam shafts, the motion sources may comprise such cams. Alternatively, for those engines employing an overhead valve implementation, the motion sources may comprise a pushrod that, in turn, engages a tappet directly contacting a cam located within the engine's block. Regardless, such motion sources 110, 120 are uniquely associated with a given cylinder in the sense that the motion sources 110, 120 only provide motion to that cylinder's valves. As known in the art, each motion source 110, 120 typically provides motions to either a cylinder's intake valves only or the cylinder's exhaust valves only. As described in further detail below, the instant disclosure describes techniques whereby valve motions for one type of valve (intake or exhaust) may be derived from other valve type's motion source.

As shown, the first motion source 104 is operatively connected to a first motion transfer mechanism 112 that, in turn, is operatively connected to a first engine valve 116 via a motion decoupler 114. Similarly, the second motion source 120 is operatively connected to a second motion transfer mechanism 122 that, in turn, is operatively connected to one or more second motion sinks 126. Both the first and second motion transfer mechanisms 112, 122 operate to convey those motions received from their respective motion sources 110, 120 to their corresponding engine valves 116, 126. Once again, the particular implementation of the first and second motion transfer mechanisms 112, 122 will depend on implementation of the motion sources 110, 120. For example, where the motion sources 110, 120 are provided by one or more overhead cams, the first and second motion transfer mechanisms 112, 122 may comprise rocker arms equipped with cam rollers or tappets for contacting the corresponding overhead cams. Alternatively, for an overhead valve implementation, the first and second motion transfer mechanisms 112, 122 may comprise rocker arms operatively connected to pushrods contacting tappets that are, in turn, contacting cams. The first engine valve 116 may comprise a valve of the type typically used to control the flow of fluids or gases into and out of an engine cylinder, e.g., poppet valves. In the context of the instant disclosure, the first engine valve 116 may comprise an exhaust valve or an intake valve. It is noted that particular examples in which the first engine valve 116 is described as an exhaust valve are provided below when describing operation of the various embodiments disclosed herein. However, it is understood that the first engine valve 116 could equally be described as an intake valve in these examples without loss of generality. As used herein, a motion sink is any device that receives the motions transferred by a motion transfer mechanism. Thus, in addition to an engine valve, a motion sink may comprise a fuel injector or an element used to absorb lost motions within a valve train. Once again, where the second motion sink(s) 126 comprise one or more engine valves, such valves may comprise intake valves or exhaust valves.

As described in greater detail below, auxiliary motions derived from the second motion source 120 may conflict with motions normally provided by the first motion source 110. To prevent this conflict, the motion decoupler 114 is provided to selectively discontinue transfer of motion from the first motion transfer mechanism 112 to the first engine valve 116. For example, in the case of four-valve cylinders (two intake valves, two exhaust valves), the motion decoupler 114 may comprise a collapsible valve bridge positioned between a rocker arm and that pair of valves comprising the first engine valve 116. Alternatively, in the case of two-valve cylinders, the motion decoupler 114 may comprise a collapsible tappet incorporated into an element of the first motion transfer mechanism 112, such as a rocker arm, pushrod or tappet. As known in the art, such collapsible mechanisms are typically hydraulic devices controlled through the selective provision or release of hydraulic fluid.

As shown in FIG. 1, such control of the motion decoupler 114 is provided by a controller 140 in conjunction with one or more switched controls 142. In practice, the controller 140 may comprise a processing device such as a microprocessor, microcontroller, digital signal processor, co-processor or the like or combinations thereof capable of executing stored instructions, or programmable logic arrays or the like, as embodied, for example, in an engine control unit (ECU). For example, in one embodiment, the controller 140 may be coupled to a user input device (e.g., a switch, not shown) through which a user may be permitted to activate a desired auxiliary valve motion mode of operation. Detection by the controller 140 of selection of the user input device may then cause the controller 140 to provide the necessary signals to switched control(s) 142 that then, in turn, activated or deactivate the motion decoupler 114. Alternatively, or additionally, the controller 140 may be coupled to one or more sensors (not shown) that provide data used by the controller 140 to determine how to control the switched control(s) 142. In an embodiment, particularly applicable where the motion decoupler 114 (and, as described below, the third motion transfer mechanism 130) is an hydraulically enabled device, the switched control(s) 142 may comprise solenoids used to control the flow of an hydraulic fluid, such as engine oil, from a pressurized fluid supply (not shown). Furthermore, in the embodiment illustrated in FIG. 1, the cylinder 102 has switched control(s) 142a uniquely associated therewith in the sense that operation of the switched controls 142a is applied only to that cylinder 102. In an alternate embodiment, common or global switched controls 142b may be optionally used instead, in which case operation of the switched control(s) 142b services case multiple cylinders.

As further illustrated in FIG. 1, a third motion transfer mechanism 130 is provided and configured to be operatively connected to the second motion source 120 and the first engine valve 116. In an embodiment, such operative connection of the third motion transfer mechanism 130 is controlled by the controller 140 and switched control(s) 142. Similar to the other motion transfer mechanisms 112, 122, the third motion transfer mechanism 130 operates, when enabled, to transfer motions from the second motion source 120 to the first valve 116. In an embodiment, this transfer of motion occurs during periods in which the motion decoupler 114 is operative to discontinue transfer of motion between the first motion transfer mechanism 112 and the first valve 116, thereby preventing any of the motions attributable to the first motion source 110 from interfering with or overriding motions provided by the second motion source 120. For example, in the context of engine braking where the first engine valve 116 is an exhaust valve, certain auxiliary motions are provided to the exhaust valve by the second motion source 120 (via, for example, lost motion cam lobes as described below) through the third motion transfer mechanism 130. However, as known in the art, these auxiliary motions (such as CR or BGR events) can temporally overlap with an exhaust main event provided, in this case, by the first motion source 110. By controlling the motion decoupler 114 to discontinue transfer of motions from the first motion source 110, this conflict is avoided. Of course, even when motions from the first motion source 110 are discontinued, motions from the third motion transfer mechanism 130 must still be provided to the first engine valve 116. To this end, as described below, a transfer path between the third motion transfer mechanism 130 and the first valve 116 separate from that used by the first motion transfer mechanism 112 is provided.

A reset mechanism 132 is also provided operatively connected to the second and third motion transfer mechanisms 122, 130. The reset mechanism 132 is provided to selectively discontinue transfer of motion by the third motion transfer mechanism 130 in order to, once again, avoid the transfer of undesired motions to the first engine valve. In various embodiments described below, particularly in the case where the third motion transfer mechanism 130 is an hydraulic device, the reset mechanism 132 may comprise a valve or accumulator configured to displace hydraulic fluid thereby disabling the third motion transfer mechanism 130. For example, and continuing with the example above in which the first engine valve 116 is an exhaust valve, because the second motion source 120 is an intake motion source, such as an intake cam, it will necessarily include motions (e.g., the intake main event) that would normally be transferred to an intake valve by the second motion transfer mechanism 112. Once again, however, allowing these intake events to be transferred to the exhaust valve would interfere with its desired operation. Thus, by keying operation of the reset mechanism 132 to operation of the second motion transfer mechanism 122, which necessarily reflects the motions imparted by the second motion source 120, the undesired motions from the second motion source 120 are effectively lost relative to the first engine valve 116 when the reset mechanism 132 disables the third motion transfer mechanism 130.

Figure 2:
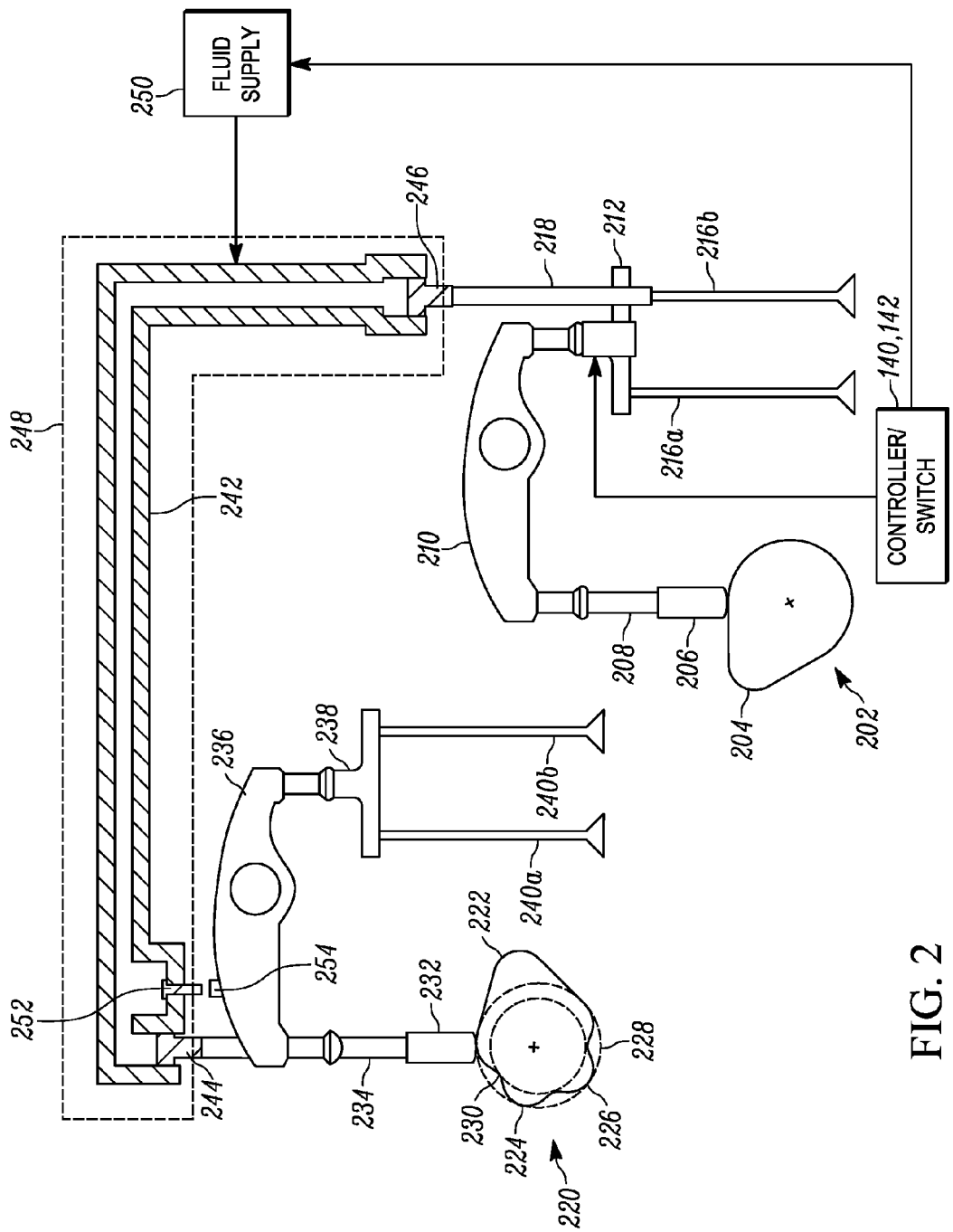
FIG. 2 is a schematic illustrating an apparatus in accordance with a second embodiment of the instant disclosure.

Referring now to FIG. 2, a schematic illustration of a second embodiment of an apparatus in accordance with the instant disclosure is shown. In the illustrated example, a four-valve cylinder is shown, as reflected by the pairs of exhaust and intake valves 216, 240. In this example, the first motion source comprises an exhaust cam 202 comprising a main exhaust lobe 204. The first motion transfer mechanism in this example comprise a tappet 206, a pushrod 208 and a rocker arm 210. Note that the various components illustrated in FIG. 2 are not necessarily shown to scale and various other components that would typically be found in an internal combustion engine (e.g., valve springs, cylinder head, etc.) are not shown for ease of illustration. As known in the art, the tappet 206 rides on the exhaust cam 204 and, in turn, transfers motions imparted by the cam profile (e.g., main exhaust lobe 204) to the pushrod 208. Movement of the pushrod 208 causes reciprocal motion of the rocker arm 210 that is then transferred to the exhaust valves 216 by a valve bridge 212. In this case, the motion decoupler is provided within the valve bridge 212, as schematically illustrated by a collapsible element 214. When collapsed, the collapsible element 214 effectively loses those motions provided by the rocker arm 210. As described in greater detail below, when the rocker arm 210 movements are lost by the collapsible element 214, auxiliary movement of an exhaust valve 216b may nevertheless be provided by a bridge pin 218 that is capable of operating independently of the valve bridge 212.

FIG. 2 additionally illustrates an intake cam 220 comprising a main intake lobe 222 and, in this example, a plurality of lost motion or auxiliary motion lobes 224, 226. Similar to the exhaust valve train linkage described above, the second motion transfer mechanism comprises a tappet 232, pushrod 234 and rocker arm 236. Once again, the tappet 232 rides the exhaust cam 220 and, in turn, transfers motions imparted by the exhaust cam profile to the pushrod 234. Movement of the pushrod 234 causes reciprocal motion of the rocker arm 236 that is then transferred to the intake valves 240 by a valve bridge 238. In an embodiment, the pushrod 234 and tappet 232 are biased into continuous contact with the exhaust cam 230. Under normal operating conditions (e.g., positive power), the rocker arm 236 may be lashed relative to the pushrod 234 such that the rocker arm 236 effectively follows a main base circle 228 of the intake cam 220. Thus, only motion imparted by lobes rising above the main base circle 228, e.g., the main intake lobe 222, are sufficient to take up this lash and impart motion through the rocker arm 236. However, as described in greater detail below, the rocker arm 236 lash may also be taken up through operation of the third motion transfer mechanism such that the rocker arm 236 effectively follows a sub-base circle 230 and thereby receives those additional motions imparted by the auxiliary lobes 224, 226. In turn, these auxiliary motions are then transferred by the third motion transfer mechanism to the first (exhaust) engine valve 216b. In the illustrated example, a pair of auxiliary lobes 224, 226 providing essentially equal lift and dwell times are shown. However, as will be appreciated by those having ordinary skill in the art, the number, size and position of such lobes can vary widely as required to achieve the desired auxiliary valve motions.

The third motion transfer mechanism is illustrated in FIG. 2 as a hydraulic circuit 242 providing fluid communication between a master piston 244 and a slave piston 246. In an embodiment, these components making up the third motion transfer mechanism may be disposed within an housing 248 that is separate from, but configured to be attached to, the internal combustion engine. For example, the housing 248 may comprise an overhead housing that attached to the top of a cylinder head. As schematically illustrated in FIG. 2, hydraulic fluid may be supplied to the hydraulic circuit 242 from a fluid supply 250 under the direction of the controller 140 and switched control(s) 142 as described above. When fully charged with hydraulic fluid, the enclosed volume of substantially incompressible hydraulic fluid between the master piston 244 and the slave piston 246 serves as an essentially inelastic pathway for the transmission of motion from the master piston 244 to the slave piston 246. Although not illustrated in FIG. 2, hydraulic fluid from the fluid supply 250 may be provided to the hydraulic circuit 242 via a check valve that prevents fluid from flowing back out of the hydraulic circuit 242, thereby maintaining the high pressures that develop within the hydraulic circuit 242 during motion transfer. Additionally, as the hydraulic circuit 242 is charged, the master piston 244 and slave piston 246 extend out of their corresponding bores (typically against the bias of springs, not shown, biasing these piston into their bores) in order to take up any lash that would otherwise prevent transmission of motion through the hydraulic circuit 242. In the illustrated example, the master piston 244 extends out to the point that it contacts the intake rocker arm 236, and the slave piston 246 extends to make contact with bridge pin 218.

Finally, a reset mechanism is provided through the cooperation of a valve 252 and a contact pad 254 integrally formed within, or otherwise attached to, the intake rocker arm 236. Although not shown, a spring may be provided to bias the valve 252 closed, thereby normally preventing the escape of hydraulic fluid in the hydraulic circuit 242. As shown, the valve 252 and the contact pad 254 are separated by a sufficient amount of lash such that the transmission of motions arising from the auxiliary lobes 244, 246 may be transmitted through the hydraulic circuit 242. However, as motion imparted by the main intake lobe 222 begins to be transmitted through the tappet 232 and pushrod 234, thereby causing both the master piston 244 to further translate into its bore and the intake rocker arm 236 to rotate farther, the lash between the valve 252 and the contact pad 254 will be taken up completely. At that point, further rotation of the intake rocker arm 236 by virtue of the main intake lobe 222 will cause displacement of the valve 252, thereby creating an escape path for the hydraulic fluid within the hydraulic circuit 242. The resulting release of hydraulic fluid will prevent further motion of the master piston 244 from being transferred to the slave piston 246, thereby effectively losing the motion that would otherwise be imparted by the main intake lobe 222 on the exhaust valve 216*b*.

Figure 3:
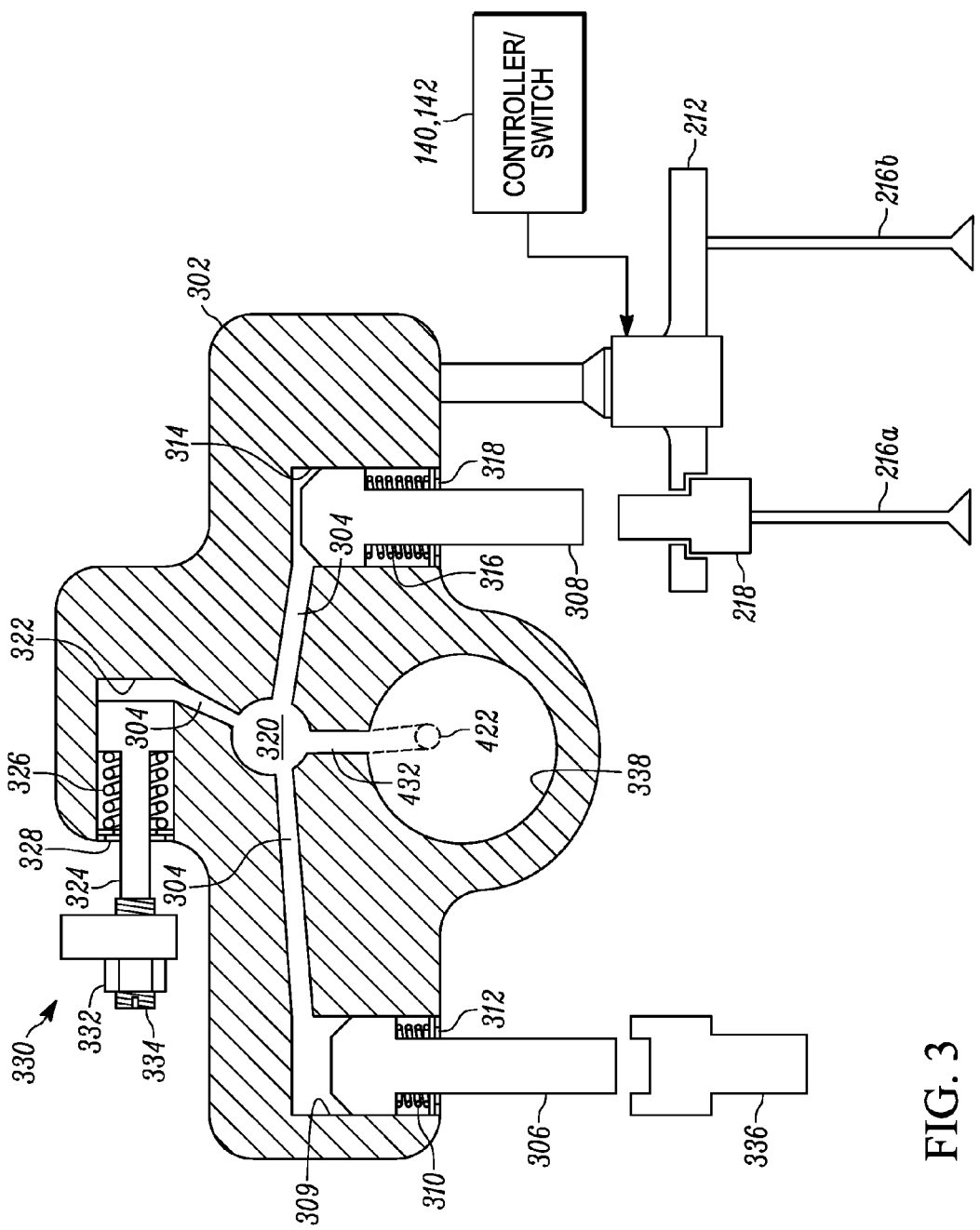
FIGS. 3 and 4 are schematic illustration of an apparatus in accordance with a third embodiment of the instant disclosure.
Figure 4:
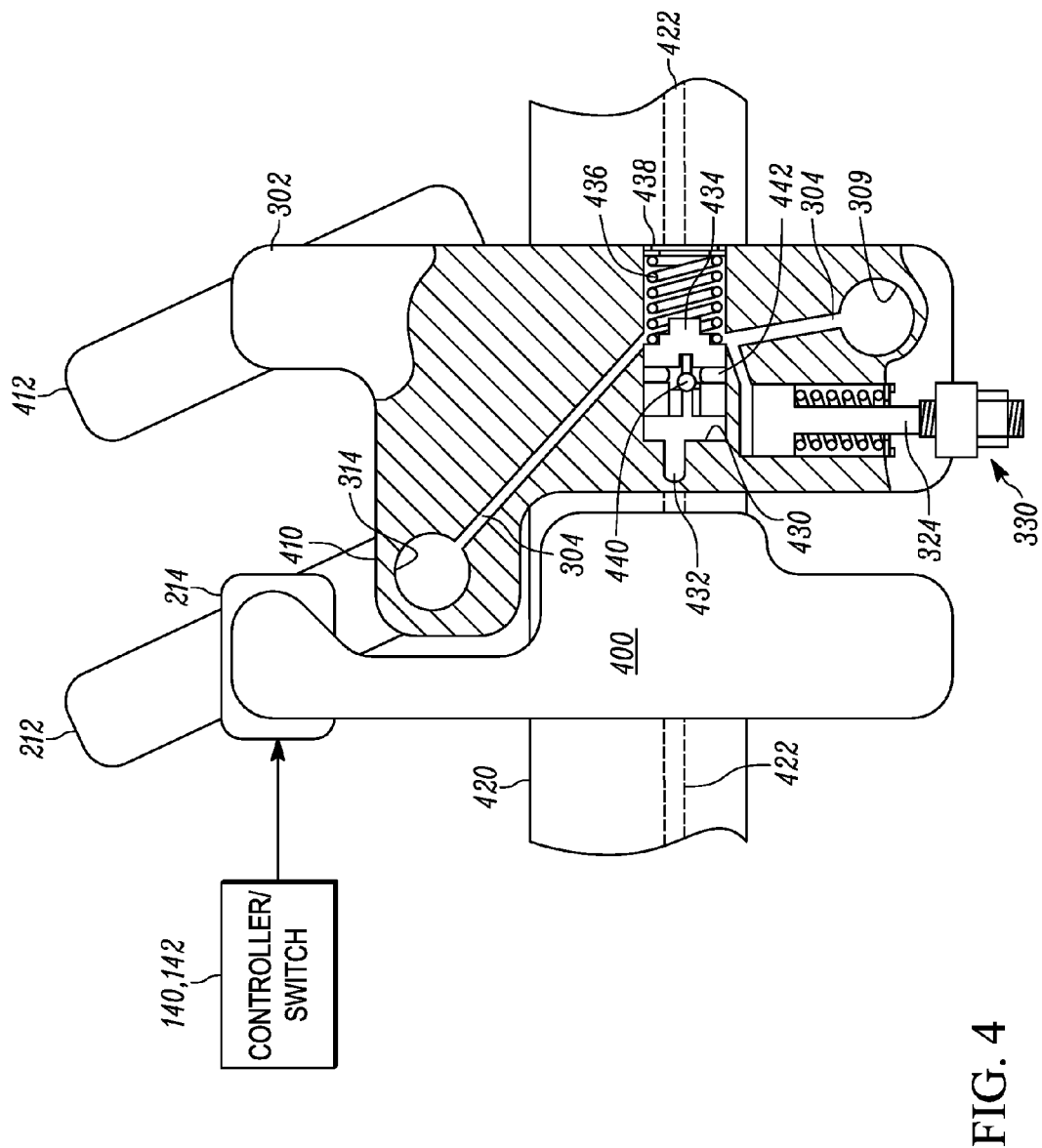

Referring now to FIGS. 3 and 4, a schematic illustration of a third embodiment of an apparatus in accordance with the instant disclosure is shown. In particular, FIG. 3 illustrates a partial cross-sectional view of an intake rocker arm 302 having an integrated hydraulic circuit 304 providing fluid communication between a master piston 306 and a slave piston 308. The master piston 306 is biased into a master piston bore 308 by operation of a master piston bias spring 310 and a master piston retaining washer and ring 312. Similarly, the slave piston 308 is biased into a slave piston bore 314 by operation of a slave piston bias spring 316 and a slave piston retaining washer and ring 318. Both the master and slave piston bores 308, 314 are in fluid communication with the hydraulic circuit 304. In this embodiment, a control valve 320 is also provided in fluid communication with the hydraulic circuit 304. Furthermore, an accumulator bore 322 is provided in fluid communication with the hydraulic circuit 304. An accumulator piston 326 is biased into the accumulator bore 322 by operation of an accumulator bias spring 326 and an accumulator piston retaining washer and ring 328. A reaction post 330 is aligned for contact with the accumulator piston 324, and comprises an adjustable screw 332 and lock nut 332, thereby permitting lash between the reaction post 330 and the accumulator piston 324 to be set as desired.

In the illustrated embodiment, the hydraulic circuit 304 is not charged with hydraulic fluid and, as a result, the master piston 306 and slave piston 308 are substantially retracted into their respective bores 308, 314. In practice, the bias provided by the master piston bias spring 310 and the slave piston bias spring 316 is relatively low such that charging of the hydraulic circuit 304 will be sufficient to overcome these respective spring biases. As a consequence, the lash illustrated between the master piston 306 and an intake pushrod 336 and between the slave piston 308 and the bridge pin 218 will be taken up. In contrast, the bias provided by the accumulator bias spring 326 is relatively high such that charging of the hydraulic circuit 304 with relatively low pressure hydraulic fluid will not be sufficient to overcome the bias of the bias spring 326. As a result, very little hydraulic fluid will flow into the accumulator bore 322.

As shown in FIGS. 3 and 4, the intake rocker arm 302 may comprise a rocker arm bore 338 configured to receive a suitable rocker arm shaft 420. The rocker arm shaft 420 may comprise an hydraulic fluid supply channel 422, as known in the art. The hydraulic fluid supply channel 422 may be aligned with an hydraulic fluid port 432 in fluid communication with the control valve 320. Control of flow of hydraulic fluid in the hydraulic fluid supply channel 422 may be provided by a switched control (not shown), as described above.

As best illustrated in FIG. 4, the control valve 320 may comprise a control valve bore 430 having a control valve piston 434 disposed therein. As shown, the control valve bore 430 is in fluid communication with the hydraulic fluid port 432, thereby permitting the hydraulic fluid, when supplied, to be presented to a first face of the control valve piston 434. The control valve piston 434 is biased into the control valve bore 430 by operation of a control valve bias spring 436 and a control valve retaining washer and ring 438 facing a second face of the control valve piston 434. In the illustrated embodiment, the control valve piston 434 comprises a check valve 440 disposed therein and facing the first face of the control valve piston 434.

When present, the hydraulic fluid is sufficiently pressurized to overcome the bias of the check valve spring 436 causing the check valve 440 to open, thereby permitting hydraulic fluid to flow into a transverse bore 442 formed in the control valve piston 434. Simultaneously, the presence of the hydraulic fluid in the hydraulic fluid port 432 causes the control valve piston 434 to overcome the bias provided by the control valve spring 436, thereby permitting the control valve piston 434 to displace (toward the right in FIG. 4) until the transverse bore 442 substantially aligns with the hydraulic circuit 304 where it intersects with control valve bore 430. At that point, the hydraulic fluid is free to flow into, and thereby charge, the hydraulic circuit 304. Once the hydraulic circuit 304 has been filled, the pressure gradient across the check valve ball 440 will equalize, thereby substantially preventing the escape of the hydraulic fluid from the hydraulic circuit 304.

Conversely, when the supply of pressurized hydraulic fluid is removed from the hydraulic fluid port 432, the decrease in pressure presented to the control valve piston 434 allows the control valve spring 436 to once again bias the control valve piston 434 back to its resting position. In turn, this causes a reduced-diameter portion of the control valve piston 434 to align with the hydraulic circuit 304, thereby permitting the hydraulic fluid within the hydraulic circuit 304 to be released. As a result, the master and slave pistons 306, 308 will then be retracted into their respective bores 308, 314.

FIG. 4 also illustrates an exemplary configuration of the intake rocker 302, as well as placement of the intake rocker 302 relative to an exhaust rocker 400. In this embodiment, the slave piston bore 324 is disposed within a slave piston boss 410 extending laterally from the intake rocker 302, thereby positioning the slave piston 308 above an inboard exhaust valve 216a, though those having ordinary skill in the art will appreciate that the boss 410 could be configured to place the slave piston 308 above an outboard exhaust valve 216b as well. FIG. 4 additionally illustrates an intake valve bridge 412 configured and positioned to actuate intake valves (not shown) by virtue of movement of the intake rocker 302.

As with the embodiment of FIG. 2, when the hydraulic circuit 304 is charged, motion applied to the master piston 306 by the intake pushrod 336 will be transferred to the slave piston 308 and, consequently, to the exhaust valve 216a by virtue of the bridge pin 218. Though not illustrated in FIGS. 3 and 4, an exhaust cam having lost motion lobes, as illustrated in FIG. 2, may provide the desired auxiliary motions to the intake pushrod 336. Also, as in FIG. 2, when the hydraulic circuit 304 is transmitting the auxiliary motions to the exhaust valve 216a, the collapsible element 214 prevents movement of the exhaust rocker 400 from being transmitted to the exhaust valves 216.

When the hydraulic circuit 304 is charged, motions applied to the master piston 306 will generate very high pressures within the hydraulic circuit 304 that would normally be sufficient to overcome the bias presented by the accumulator bias spring 436, thereby causing the accumulator piston 324 to displace. However, during the auxiliary valve movements, the accumulator piston 324 is in contact with the reaction post 330, thereby preventing it from displacing out of its bore 322. (Additionally, though not shown in FIG. 3, a spring or similar device may be provided biasing the rocker arm 302 into contact with the pushrod 336, e.g., above and in contact with that side of rocker arm 302 receiving auxiliary motion from the pushrod 336, such that motions received by the rocker arm 302 from the pushrod 336 will be transferred through the master piston 306, rather than causing the rocker arm 302 to rotate about the rocker arm shaft.) When the intake main event, however, is applied to the master piston 306, the rocker arm 302 will rotate such that the accumulator piston 324 is no longer in contact with the reaction post 330. When this occurs, the pressure within the hydraulic circuit 304 will overcome the bias of the accumulator bias spring 326, thereby allowing the accumulator piston 306 to displace and take up a portion of the hydraulic fluid from the hydraulic circuit 304 into the accumulator piston bore 322. This effective expansion of the volume containing the hydraulic fluid decreases the pressure in the hydraulic circuit 304, thereby discontinuing the ability of the hydraulic circuit 304 to transfer motions applied to the master piston 306 to the slave piston 308. As a result, that portion of the intake main event following displacement of the accumulator piston 324 is lost, thereby preventing corresponding motion of the exhaust valve 216a. The hydraulic fluid then residing within the accumulator piston bore 322 is thereafter available for recharging the hydraulic circuit 304 following the intake main event.

Figure 5:
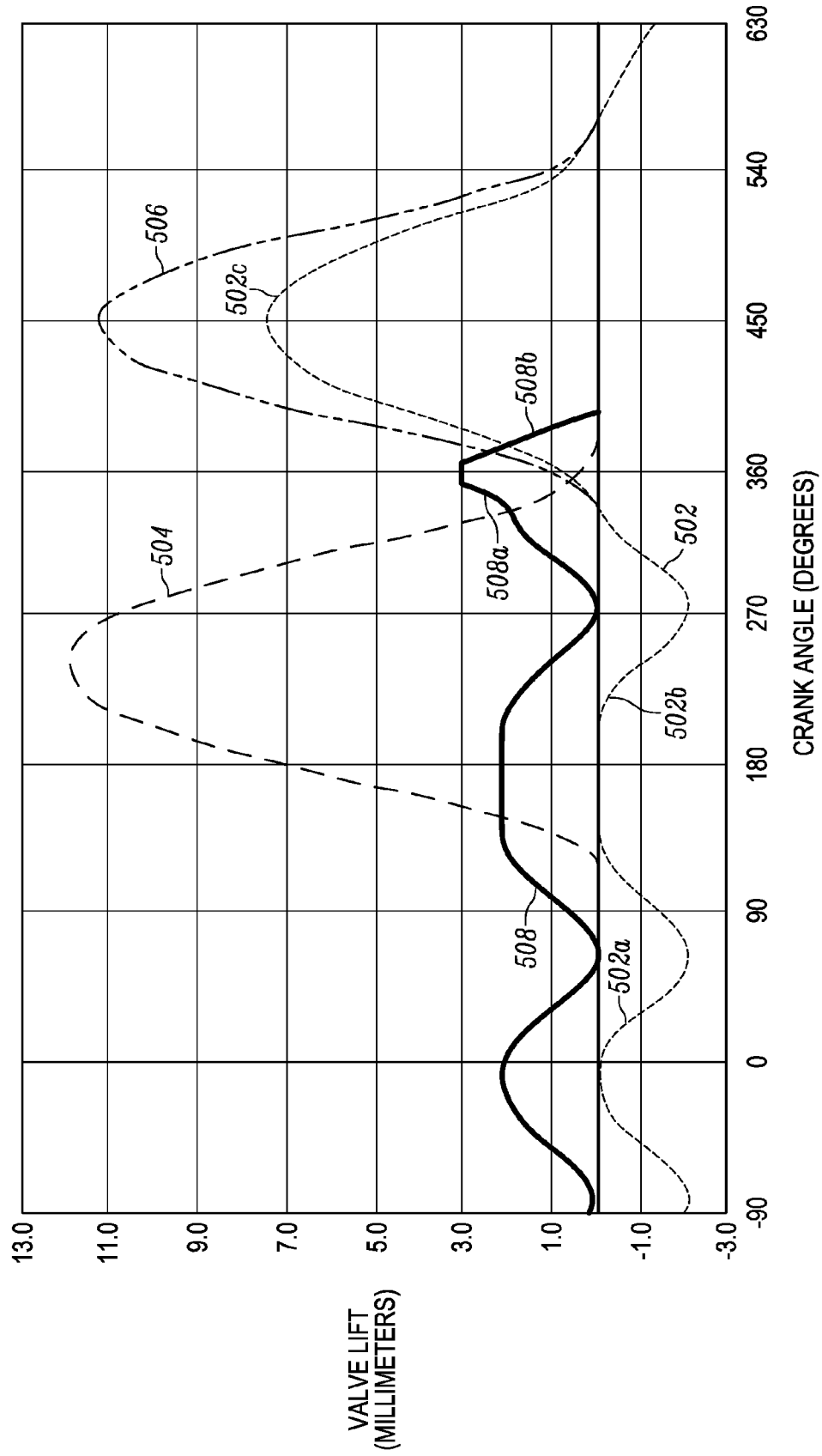
FIG. 5 illustrates a cam lift profile and valve movements in accordance with an exemplary embodiment of the instant disclosure.

Referring now to FIG. 5, an intake cam lift profile and exhaust valve movements in accordance with an exemplary embodiment of the instant disclosure are illustrated. In this exemplary embodiment, an intake cam profile 502 comprises a plurality of lost motion or auxiliary event lobes 502a, 502b along with a main intake event lobe 502c. Note that, the main base circle 228 is represented in FIG. 5 by the x-axis, whereas the sub-base circle 230 is represented by the lowest portions of the intake cam profile 502. Further note that the auxiliary event lobes 502a, 502b overlap with the typical main exhaust event lift 504. However, as described above, the main exhaust event lift 504 is discontinued by operation of the motion decoupler 114. As a result, the actual exhaust valve lift 508 closely follows the intake cam profile 502 during the auxiliary motions. As further shown, the actual exhaust valve lift 508 initially follows 508a the main intake event lobe 502c, i.e., between approximately 325 degrees and 360 degrees along the x-axis. However, as described above, continued progression of the main intake event causes the reset mechanism 132 to discontinue transfer of the main intake event motion to the exhaust valve, i.e., the intake main event valve motion is lost, thereby permitting the exhaust valve to close 508b.

As described above, the instant disclosure describes techniques whereby auxiliary valve motions may be achieved despite engine configurations that do not permit the use of dedicated auxiliary motion sources, and that do not require the added complexity of inter-cylinder lost motion linkages. In the example of auxiliary valve motions being applied to an exhaust valve (as would be the case for CR or BGR, for example), this is achieved by deactivating the normal exhaust valve motions, i.e., the exhaust main event, and replacing it with auxiliary motions derived from the intake motion source, but not the intake main event, from the same cylinder. Such selective application of the intake motion source to the exhaust valve is accomplished through the provision of a motion transfer mechanism between the intake motion source and the exhaust valve, along with a motion decoupler to prevent normal exhaust motions being applied to the exhaust valve as well as a reset mechanism to prevent normal intake motions, i.e., the intake main event, from also being applied to the exhaust valve. Consequently, the benefits of auxiliary valve motions may be more efficiently provided to engine platforms that previously required more complex and expensive solutions.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. An apparatus for actuating a first engine valve associated with a cylinder of an internal combustion engine, the internal combustion engine further comprising a first motion transfer mechanism for transferring motion from a first motion source to the first engine valve and a second motion transfer mechanism for transferring motion from a second motion source to at least one second motion sink, wherein the first motion source and the second motion source are uniquely associated with the cylinder, the apparatus comprising:

a third motion transfer mechanism, configured to be operatively connected to the second motion source and the first engine valve, and further configured to transfer motion from the second motion source to the first engine valve;

a motion decoupler, configured to be operatively connected to the first motion transfer mechanism and the first valve, and further configured to selectively discontinue transfer of motion from the first motion transfer mechanism to the first valve; and a reset mechanism, configured to be operatively connected to the second motion transfer mechanism and the third motion transfer mechanism, and further configured to selectively discontinue transfer of motion from the third motion transfer mechanism to the first engine valve based on operation of the second motion transfer mechanism.

2. A system comprising the apparatus of claim 1, and further comprising:
a controller, configured to be operatively connected to the motion decoupler, and further configured to instruct the motion decoupler when to discontinue transfer of motion from the first motion transfer mechanism to the first valve.

3. The apparatus of claim 1, wherein the third motion transfer mechanism comprises:
a master piston configured to receive motion from the second motion source;
a slave piston configured to transfer motion to the first engine valve; and
an hydraulic circuit providing fluid communication between the master piston and the slave piston.

4. The apparatus of claim 3, further comprising:
a check valve configured to supply hydraulic fluid to the hydraulic circuit.

5. The apparatus of claim 4, further comprising a control valve, wherein the check valve is disposed within the control valve.

6. The apparatus of claim 3, wherein the reset mechanism comprises a valve in fluid communication with the hydraulic circuit and configured to release hydraulic fluid from the hydraulic circuit.

7. The apparatus of claim 3, wherein the reset mechanism comprises an accumulator in fluid communication with the hydraulic circuit and configured to receive hydraulic fluid from the hydraulic circuit.

8. The apparatus of claim 1, wherein the third motion transfer mechanism and the reset mechanism are disposed in a housing configured for attachment to the internal combustion engine.

9. The apparatus of claim 1, wherein the second motion transfer mechanism comprises a rocker arm, and wherein the third motion transfer mechanism and the reset mechanism are disposed within the rocker arm.

10. An apparatus for actuating a first engine valve associated with a cylinder of an internal combustion engine, the internal combustion engine further comprising a first rocker arm for transferring motion from a first motion source to the first engine valve and a second rocker arm for transferring motion from a second motion source to a second engine valve associated with the cylinder, wherein the first motion source and the second motion source are uniquely associated with the cylinder, the apparatus comprising:
an hydraulic lost motion assembly, configured to be operatively connected to the second motion source and the first engine valve, comprising a master piston configured to receive motion from the second motion source, a slave piston configured to provide motion to the first engine valve and an hydraulic circuit providing fluid communication between the master piston and the slave piston;
a motion decoupler, configured to be operatively connected to the first rocker arm and the first valve, and further configured to selectively discontinue transfer of motion from the first rocker arm to the first valve; and
a reset mechanism, configured to be operatively connected to the second rocker arm and the hydraulic circuit, and further configured to selectively displace hydraulic fluid in the hydraulic circuit based on operation of the second rocker arm.

11. The apparatus of claim 10, wherein the hydraulic lost motion assembly is disposed within a housing configured for attachment to the internal combustion engine.

12. The apparatus of claim 10, wherein the second motion transfer mechanism comprises a rocker arm, and wherein the hydraulic lost motion assembly is disposed within the rocker arm.

13. The apparatus of claim 10, further comprising:
a check valve configured to supply hydraulic fluid to the hydraulic circuit.

14. The apparatus of claim 13, further comprising a control valve, wherein the check valve is disposed within the control valve.

15. The apparatus of claim 10, wherein the reset mechanism comprises a valve in fluid communication with the hydraulic circuit and configured to release the hydraulic fluid from the hydraulic circuit.

16. The apparatus of claim 10, wherein the reset mechanism comprises an accumulator in fluid communication with the hydraulic circuit and configured to receive hydraulic fluid from the hydraulic circuit.

17. A system comprising the apparatus of claim 10, and further comprising:
a controller, configured to be operatively connected to the motion decoupler, and further configured to instruct the motion decoupler when to discontinue transfer of motion from the first rocker arm to the first valve.

18. The system of claim 17, wherein the first motion source and the second motion source comprise an exhaust cam and an intake cam, respectively.

19. The system of claim 18, wherein the intake cam comprises a lost motion lift profile.

20. The system of claim 17, wherein the first motion source and the second motion source comprise pushrods operatively coupled to an exhaust cam and an intake cam, respectively.

21. The system of claim 20, wherein the intake cam comprises a lost motion lift profile.

22. An apparatus for actuating an exhaust valve associated with a cylinder of an internal combustion engine, the internal combustion engine further comprising an exhaust rocker arm for transferring motion from an exhaust motion source to the exhaust valve, the apparatus comprising:
an intake rocker arm configured to transfer motion from an intake motion source to an intake valve associated with the cylinder, wherein the exhaust motion source and the intake motion source are uniquely associated with the cylinder, the intake rocker arm further comprising a master piston configured to receive motion from the intake motion source, a slave piston configured to provide motion to the exhaust engine valve and an hydraulic circuit providing fluid communication between the master piston and the slave piston; and
a motion decoupler, configured to be operatively connected to the exhaust rocker arm and the exhaust valve, and further configured to selectively discontinue transfer of motion from the exhaust rocker arm to the exhaust valve,
wherein the intake rocker arm further comprises a reset mechanism in fluid communication with the hydraulic circuit, the reset mechanism configured to selectively displace hydraulic fluid in the hydraulic circuit based on operation of the intake rocker arm.

23. The apparatus of claim 22, further comprising:
a check valve configured to supply hydraulic fluid to the hydraulic circuit.

24. The apparatus of claim 23, further comprising a control valve, wherein the check valve is disposed within the control valve.

25. The apparatus of claim 22, wherein the reset mechanism comprises a valve in fluid communication with the hydraulic circuit and configured to release the hydraulic fluid from the hydraulic circuit.

26. The apparatus of claim 22, wherein the reset mechanism comprises an accumulator in fluid communication with the hydraulic circuit and configured to receive hydraulic fluid from the hydraulic circuit.

27. A system comprising the apparatus of claim 22, and further comprising:
- a controller, operatively connected to the motion decoupler, configured to instruct the motion decoupler when to discontinue transfer of motion from the exhaust rocker arm to the first valve.

28. The system of claim 27, wherein the exhaust motion source and the intake motion source comprise cams.

29. The system of claim 28, wherein the cam corresponding to the exhaust motion source comprises a lost motion lift profile.

30. The system of claim 27, wherein the exhaust motion source and the intake motion source comprise pushrods operatively coupled to cams.

31. The system of claim 30, wherein the cam corresponding to the exhaust motion source comprises a lost motion lift profile.

* * * * *